Figure 4:
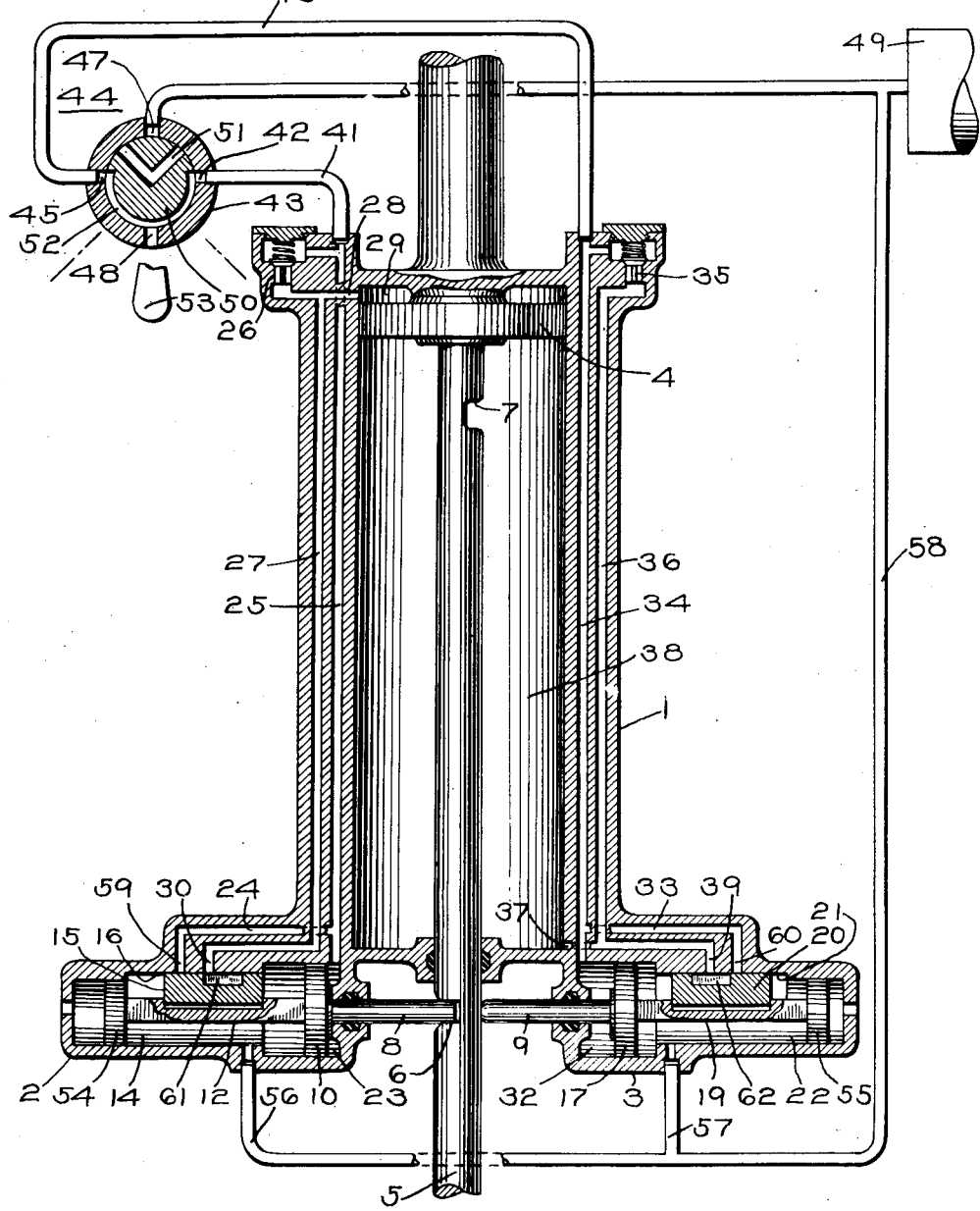

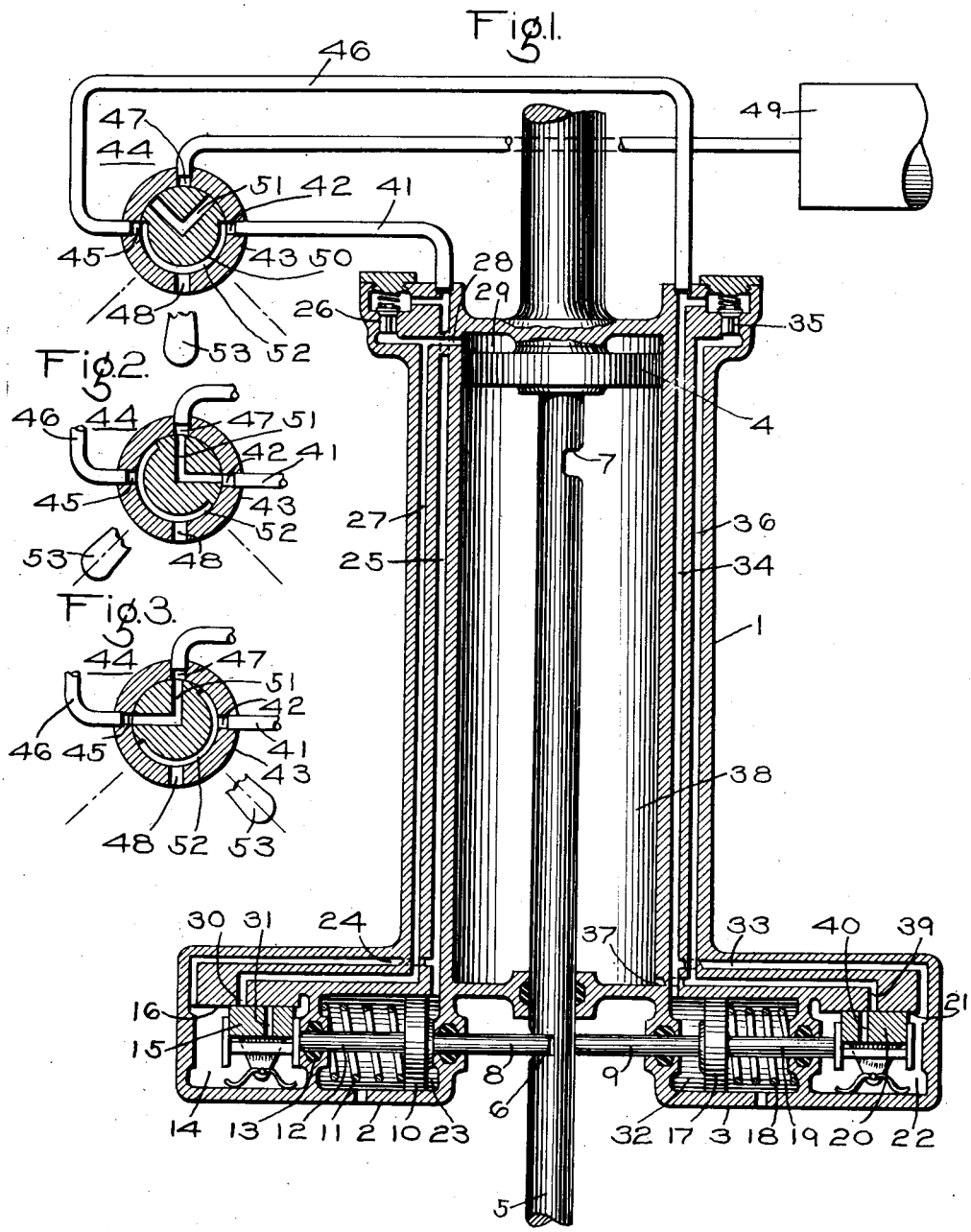

Sept. 20, 1938.  A. GNAVI  2,130,618
FLUID PRESSURE MOTOR AND LOCKING MEANS THEREFOR
Filed April 30, 1937  2 Sheets-Sheet 2

INVENTOR
ALDO GNAVI
BY Wm. M. Cady
ATTORNEY

Patented Sept. 20, 1938

2,130,618

UNITED STATES PATENT OFFICE

2,130,618

FLUID PRESSURE MOTOR AND LOCKING MEANS THEREFOR

Aldo Gnavi, Turin, Italy, assignor, by mesne assignments, to The Westinghouse Air Brake Company, Wilmerding, Pa., a corporation of Pennsylvania Application April 30, 1937, Serial No. 139,929
In Italy September 3, 1936

1 Claim. (Cl. 121—40)

This invention relates to aeroplanes and more particularly to the type in which the under-carriage including the usual landing wheels, is arranged to be withdrawn into a position offering a minimum air resistance during flight and to be projected into an operative position for landing.

One object of the invention is to provide improved mechanism adapted to be controlled by fluid under pressure for withdrawing and projecting the under-carriage of aeroplanes and means for locking said mechanism in one or the other of its positions, corresponding to the retracted and projected positions of the under-carriage.

Another object of the invention is to provide improved locking arrangements for the above mechanism adapted to be released by the action of fluid under pressure before fluid under pressure is supplied for effecting movement of the under-carriage, in order to avoid undue friction and wear on the moving parts of the operating and locking mechanism.

Still another object of the invention is to provide improved means for controlling the operation of an under-carriage mechanism, such as above described, including a manually controlled device a single movement of which is adapted to supply fluid under pressure for unlocking and operating the mechanism and means for controlling the supply of fluid under pressure from said device to said mechanism, automatically operative only after the locking mechanism has been fully operated to its unlocking position to supply fluid under pressure for operating the mechanism to raise or lower the under-carriage.

Other objects and advantages will be apparent from the following more detailed description of the invention.

In the accompanying drawings: Fig. 1 is a longitudinal sectional section of an under-carriage control mechanism embodying one form of the invention; Figs. 2 and 3 are sectional views of a control valve device, shown in Fig. 1, in its two operative positions; and Fig. 4 is a view similar to Figure 1 illustrating a modified construction.

As shown in Figs. 1, 2 and 3 of the drawings, it will be seen that the mechanism illustrated comprises a main or operating cylinder 1 and a pair of locking cylinders 2, 3 formed integral with one another and mounted in any suitable manner on the aeroplane structure. The operating cylinder 1 contains a piston 4 adapted to move therein and connected by means of a piston rod 5 and suitable transmission mechanism (not shown) to the under-carriage of the aeroplane. The piston rod 5 is provided with locking notches 6, 7 adapted to be respectively engaged by locking bolts 8, 9 when the piston 4 is in its extreme upper or lower positions in the cylinder 1 corresponding to the retracted and projected positions, respectively, of the under-carriage.

The locking bolt 8 is secured to a locking piston 10 adapted to move within the cylinder 2 and urged towards the position shown by means of a spring 11, the piston 10 being provided with a piston rod 12 extending through a suitable packing 13 into a valve chamber 14 within which is a slide valve 15 operated by the piston rod 12 and cooperating with a valve seat 16.

The locking bolt 9 is similarly secured to a locking piston 17 subject to the action of a spring 18 and having a piston rod 19 for operating a slide valve 20 cooperating with a valve seat 21 within a valve chamber 22.

The valve chamber 14 and the chamber or space 23 on the inner side of the piston 10 are in communication with one another through a passage 24 leading to a passage 25 which communicates past a spring-controlled check valve 26 with a passage 27. The upper end of the passage 27 communicates through a port 28 with the space 29 in the cylinder 1 above the piston 4 while the lower end of the passage 27 terminates in a port 30 in the valve seat 16 which is adapted to register with a port 31 in the slide valve 15 during its movement.

The valve chamber 22 and the chamber or space 32 on the inner side of the piston 17 are similarly in communication with one another through a passage 33 leading to a passage 34 which communicates past a check valve 35 with a passage 36, the lower end of which communicates through a port 37 with the space 38 in the cylinder 1 below the piston 4 and with a port 39 in the valve seat 21, the port 39 registering with a port 40 in the slide valve 20 during its movement.

The upper end of the passage 25 communicates through a pipe 41 with a port 42 in the cylindrical valve casing 43 of a control valve device 44 of the rotary plug cock type, another port 45 in this valve casing communicating through a pipe 46 with the upper end of the passage 34. Other ports 47 and 48 in the valve casing 43 communicate respectively with a fluid pressure supply reservoir 49 and with the atmosphere.

The rotary plug 50 of the control valve 44 is provided with a ported passage 51 and a cavity 52 and is adapted to be adjusted by means of a handle 53 into one or the other of the positions shown in Figures 1, 2 and 3.

The operation of the mechanism is as follows:—

In the normal or non-operating position of the control valve 44 shown in Fig. 1, the fluid pressure supply pipe 47 is lapped by the plug valve 50 and the passages 25 and 34 are in communication with the atmosphere by way of pipes 41 and 46, ports 42 and 45, cavity 52 and exhaust port 48. Consequently the valve chambers 14 and 22 and the spaces 23 and 32 are at atmospheric pressure and any fluid under pressure previously contained in the spaces 29 and 38 has been vented to the atmosphere through valves 26 and 35.

The piston 4 is shown in its extreme upper position corresponding to the retracted position of the under-carriage of the aeroplane and is locked in this position by the bolt 8 engaging the piston rod 5 in the notch 6.

If it is now desired to move the under-carriage to its projected position, the operator adjusts the control valve 44 to the position shown in Fig. 2 of the drawings and under these conditions it will be seen that the pipe 46 is still in communication with the exhaust port 48 through the cavity 52 so that atmospheric pressure is maintained in the space 32 and the valve chamber 22. The pipe 41 is however in communication with the fluid under pressure supply reservoir 49 through passage 51 in the rotary plug 50 and ports 47 and 42 and fluid under pressure will thus be supplied through passage 25 to the space 23 and the valve chamber 14. The pressure thus built up in the space 23 moves the piston 10 towards the left compressing the spring 11 and withdrawing the locking bolt 8 from the notch 6 in the piston rod 5. The slide valve 15 is correspondingly moved to the left and as soon as the bolt 8 has moved slightly past the position in which it is disengaged from the notch 6 the port 31 in the slide valve 15 registers with the port 30 in the valve seat 16. Fluid under pressure is thereupon supplied from the valve chamber 14 through ports 31 and 30 to the passage 27 from whence it flows through port 28 to the space 29 above the piston 4. The latter will consequently be moved downwardly carrying with it the piston rod 5 and thereby moving the under-carriage of the aeroplane to its projected position.

As soon as the piston 4 attains its extreme lower position in the cylinder 1, the locking bolt 9 under the action of its spring 18 is caused to enter the notch 7 thereby locking the under-carriage firmly in its projected position.

The operator then returns the control valve 44 to the position shown in Fig. 1 thus permititng the release of fluid under pressure from the space 29 by way of port 28, past the valve 26, through pipe 41, port 42, cavity 52 and port 48. Fluid under pressure is also released from the valve chamber 14 and space 23 by way of passage 25 and pipe 41 so that the piston 10 under the action of its spring 11 will move the locking bolt 8 into engagement with the piston rod 5 in which position of the piston 10 the port 30 in the seat 16 of the slide valve 15 is lapped by the slide valve which then occupies a position corresponding to that of the slide valve 20 shown in Fig. 1.

When it is desired to move the under-carriage of the aeroplane to its retracted position, the operator adjusts the control valve 44 to the position shown in Fig. 3 in which fluid under pressure is supplied from the reservoir 49 to the pipe 46 and passage 34, through the passage 51 in the rotary plug 50. The pipe 41 and passage 25 under these conditions remain in communication with the atmosphere by way of port 42, cavity 52 and exhaust port 48 so that the space 23 and the valve chamber 14 remain at atmospheric pressure.

Fluid under pressure supplied from the passage 34 builds up in the space 32 and valve chamber 22 and moves the piston 17 towards the right compressing the spring 18 and withdrawing the locking bolt 9 from engagement with the notch 7 in the piston rod 5.

As soon as the piston 17 has moved the slide valve 20 to a position in which the port 40 registers with the port 39 in the valve seat 21, which occurs when the bolt 9 has moved slightly past the position in which it is disengaged from the notch 7, fluid is supplied from the valve chamber 22 through ports 40, 39 and 37 to the space 38 below the piston 4 which is accordingly moved upwardly to the position shown in Fig. 1, thus moving the under-carriage of the aeroplane to its retracted position.

As soon as the piston 4 reaches this position the locking bolt 8 is caused under the action of the spring 11 to engage with the notch 6 in the piston rod 5 so as to lock this rod and the aeroplane under-carriage firmly in its new position.

The operator then returns the control valve 44 to the position shown in Fig. 1, whereupon fluid is released from the space 38 by way of passage 36, past the valve 35, pipe 46, cavity 52 and exhaust port 48. Fluid is also released from the space 32 and valve chamber 22 through passage 34 and pipe 46, so that the piston 17 will return to the position shown in Fig. 1 with the port 39 in the valve seat 21 lapped.

Referring now to the modified construction shown in Fig. 4 of the drawings, the locking movement of the bolts 8, 9 is, in this case, arranged to be effected by fluid under pressure in the valve chambers 14 and 22 acting upon the pistons 10 and 17 and upon smaller pistons 54, 55 secured to the piston rods 12 and 19, respectively, the outer face of said smaller pistons being open to the atmosphere. The valve chambers 14 and 22 are in permanent communication through pipes 56 and 57 and a fluid pressure supply pipe 58 with the supply reservoir 49.

The passages 25 and 34 terminate in ports 59, 60 respectively in the slide valve seats 16, 21 and the slide valves 15 and 20 are provided with cavities 61, 62 respectively.

The operation of this construction of mechanism is similar to that shown in Fig. 1 except the locking movement of bolts 8 and 9 is effected by fluid under pressure instead of springs.

When the control valve 44 is moved from its normal position shown in Figs. 1 and 4 to the position, shown in Fig. 2 for projecting the under-carriage of the aeroplane, the space or chamber 32 is maintained opened to the atmosphere, so that the pressure of fluid in valve chamber 22 acting on the differential areas of pistons 17, 55 urges the bolt 9 against the rod 5. At the same time, fluid under pressure is supplied to space 23 equalizing the fluid pressures on piston 10, whereupon the pressure of fluid in chamber 14 acting on piston 54 moves the bolt 8 out of the notch 6, after which the cavity 61 in slide valve 15 connects ports 59 and 30 through which fluid under pressure is supplied to chamber 29. The piston 4 is thereby moved downwardly for projecting the aeroplane under-carriage, and when the notch 7 is in alignment with the locking bolt 9, said bolt is moved into said notch by the pressure of fluid acting in chamber 22 on the differential areas of pistons 17 and 55. After this occurs, the control valve 44 is returned to its normal position in which the space 23 is vented to permit pistons 10, 54 to move the bolt 8 into engagement with rod 5.

When it is desired to retract the aeroplane under-carriage the valve 44 is moved to the position shown in Fig. 3 for first effecting unlocking of bolt 9 from the rod 5 and for then supplying fluid under pressure through port 60, cavity 62 in slide valve 20 and ports 39 and 37 to chamber 38 at the lower side of the piston 4. The piston 4 is thereby moved to the position shown in Fig. 1, after which the locking bolt 8 is projected into the notch 6 by the pressure of fluid in chamber 14 acting on the differential areas of pistons 10 and 54, following which the control valve 44 is again moved to the normal position shown in Figs. 1 and 4, as hereinbefore described.

While two illustrative embodiments of the invention have been described in detail, it is not my intention to limit its scope to these embodiments or otherwise than by the terms of the appended claim.

Having now described my invention, what I claim as new and desire to secure by Letters Patent, is:

In a mechanism for controlling the projecting and retracting of an aeroplane landing gear, in combination, a cylinder, a piston slidably mounted in said cylinder and movable by fluid under pressure from a position at one end of said cylinder to a position at the opposite end of said cylinder, a rod secured to and movable with said piston, locking means for securing said rod and piston against movement, means for operating said locking means to lock said rod and piston and operative by fluid under pressure to release said rod and piston, valve means having one position for releasing fluid under pressure from said means and another position for supplying fluid under pressure to said means for effecting the operation thereof and to said piston for moving said piston and rod, and a valve controlling communication from said valve means to said piston and operative by said means after release of said rod to open said communication and operative to close said communication at all other times, and a check valve in a communication between said valve means and piston by-passing said valve and through which communication fluid under pressure is adapted to be released from said piston upon the release of fluid under pressure from said means.

ALDO GNAVI.